Nov. 8, 1938.  A. H. JESSEN  2,136,104
AUTOMOTIVE TRANSMISSION
Filed April 6, 1936  2 Sheets-Sheet 1

INVENTOR.
Arnold H. Jessen
BY
ATTORNEY.

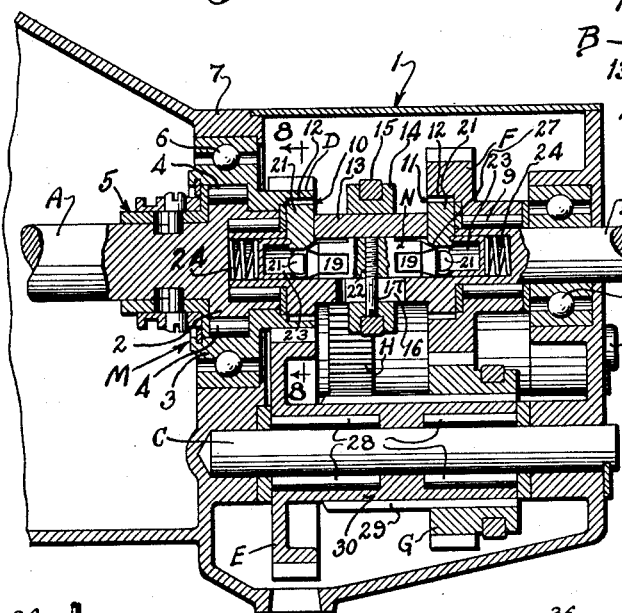

Patented Nov. 8, 1938

2,136,104

UNITED STATES PATENT OFFICE 2,136,104

AUTOMOTIVE TRANSMISSION

Arnold H. Jessen, Los Angeles, Calif.

Application April 6, 1936, Serial No. 72,985

10 Claims. (Cl. 74—333)

This invention relates to transmission mechanism for motor vehicles and has for an object the provision of a simplified and comprehensive mechanism in which the selection of one of several gear connections is effected by the forward or backward movement of a shift lever having but two positions except for neutral position, and in which a positive lock-up means is provided for holding certain gears in operative connection.

An object is to provide an improved means for operatively connecting selected gears in the transmission without shifting but a single gear for establishing different driving ratios.

A further object is to provide a free wheeling connection between the driving shaft and the initial driving gear under the control of the clutch pedal in its initial movement to permit, as usual, the coasting of the vehicle at the operation of the driving gears beyond the speed of the driving shaft.

In more detail, my invention comprehends the provision of a transmission arranged for a plurality of speeds forward and a reverse drive including: a pair of gears co-axial with the driving and driven shafts in fixed positions, a lock-up device connecting said gears for imparting direct or indirect motion thereto, one of said gears being arranged for both forward and reverse driving, a shiftable countershaft gear selectively associated with the forward and reverse gearing, and a shift lever operable for commonly shifting said countershaft gear and said lock-up device. Other objects may appear as the description progresses.

I have shown a preferred form of mechanism in the accompanying drawings in which:

Fig. 5 is a sectional elevation of the same on line 5—5 of Fig. 1;

Fig. 6 is a sectional elevation on line 6—6 of Fig. 1;

Fig. 7 is a sectional elevation on line 7—7 of Fig. 6;

Fig. 8 is a sectional view of the lock-up means, on line 8—8 of Fig. 7;

Fig. 9 is a perspective view of the lock-up cam; and

Fig. 10 is a perspective view of one of the lock-up plungers.

Figure 1:
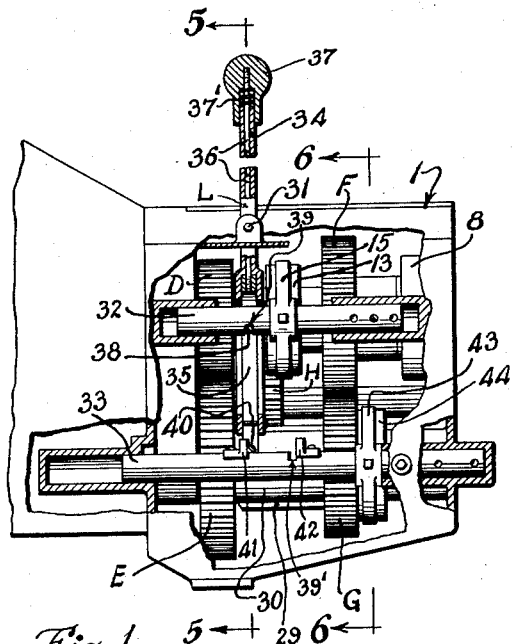
Fig. 1 is an elevation, partly in section, showing the mechanism in neutral arrangement.

My improved mechanism is, as usual, enclosed and supported in a suitable housing 1 and includes axially alined driving and driven shafts A and B, respectively, a countershaft C, a primary driving gear D operatively associated with drive shaft A and continuously meshing with a gear E rotatable on shaft C, a single driven gear F normally loose on driven shaft B and arranged for selective meshing with a second gear G on shaft C, a pair of gears H and J on an idler shaft K and a special type of shifting unit L.

Driving shaft A is operatively connected with gear D by means of a free wheeling clutch unit M embodying an enlarged cam 2 on the inner end of said shaft and a drum 3 integral with or attached to gear D, between which rollers 4 are frictionally held for imparting motion to gear D from shaft A, but permitting the rotation of said gear at a speed in excess of that of shaft A when the vehicle operates proportionately faster than the drive shaft. Said free wheeling clutch is under the control of a clutch pedal (not shown) and a shift collar 5. Gear D has its drum 3 journalled in frictionless bearing 6 in a wall or portion 7 of housing 1, as shown in Fig. 7. This free wheeling clutch is actuated by the vehicle clutch pedal in its initial movement to permit, as usual, the coasting of the vehicle at the operation of the driving gears beyond the speed of the driving shaft. The shift collar 5 when moved inward to engage the ends of rollers 4 will frictionally hold said rollers against circumferential movement relative to the cam 2 and the drum 3 will then be free to rotate relative to said rollers and the shaft A. This is the free wheeling position. When, however, the collar 5 is retracted from roller engaging position, the frictional contact of drum 3 with the rollers causes the latter to move circumferentially of the cam and wedge between the cam and said drum, as is customary in this type of clutch whereby to lock the drum 3 for rotation with said rollers and to thus establish a driving connection between the shaft A and gear D, which latter is carried by said drum.

Driven shaft B is journalled in a bearing 8 at the opposite end of housing 1 from gear D and extends into the housing for a sufficient distance to form a support for gear F which is held thereon by the interposition of a frictionless bearing 9. Gears D and F are recessed on adjacent faces, as at 10 and 11, respectively, and inwardly cut to provide internal notches 12, and a sleeve 13 integral with shaft B is coaxially mounted relative to and has its opposite ends disposed within the recesses of said gears D and F. A shift collar 14 is carried on said sleeve and is peripherally grooved to receive a yoke 15 and is provided with an elongated slot 16 through which a pin 17 from said collar extends so as to permit the shifting of the collar in position on the sleeve and its rotation with the sleeve.

The interior of sleeve 13 forms a sliding support for a longitudinally shiftable selector N which has a central portion 18 of circular cross section fitting the bore of the sleeve and outer portions 19, 19, of substantially triangular cross section with bevelled faceted ends 20, 20, which form cams for engagement with a plurality of plungers 21 adapted to shift radially in the wall of sleeve 13 into and from operative position with respect to the notches 12 in gears D and F. Said sleeve is integral with shaft B, as shown, or suitably attached thereto within or adjacent gear F as may be found desirable and convenient. Thus, the purpose of the plungers 21 is to operatively connect shaft B with gear D and shaft B with gear F under the control of and depending upon the particular movement of selector N. Pin 17 extends into a radial orifice 22 of selector N and thus effects the rotation of the selector with driven shaft B.

Plungers 21 are urged inwardly and are releasably held in tension against the cam surfaces of selector N by means of cup-like members 23, 23, held in the bore of sleeve 13 and shaft B and tensioned by means of springs 24, 24, bearing against their outer ends while their inner edges engage and seat in slight notches 25 on flattened facets 26 of each of the plungers. Thus a single member 23 serves to tension all of the plungers of one set. Said plungers have bevelled inner end portions 27 which engage the bevelled facets 20 at the ends of the selector, so that as the selector is moved longitudinally in a given direction the one set of plungers 21 will be extended radially into locking engagement with notches 12 in gears D or F, as the case may be, thereby locking gear D to shaft B through sleeve 13 or gear F to shaft B. The force of the selector N engaging the plungers 21 is sufficient to disengage the plungers from the cup-like members 23 which are but lightly engaged in the shallow notches 25 and yield incident to the pressure of the selector against said plungers.

Figure 3:
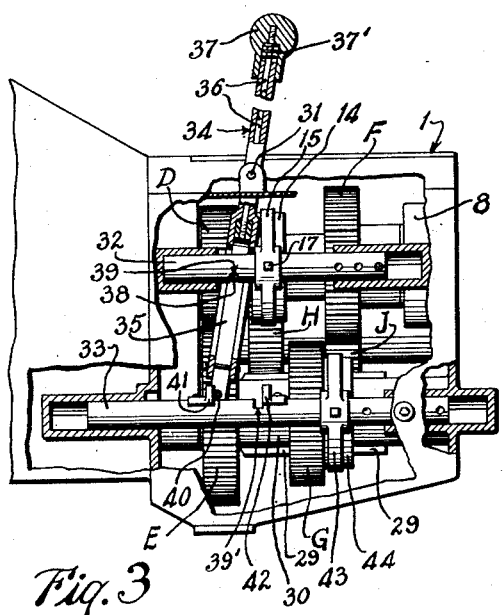
Fig. 3 is a similar view showing the mechanism in high or direct driving arrangement.
Figure 4:
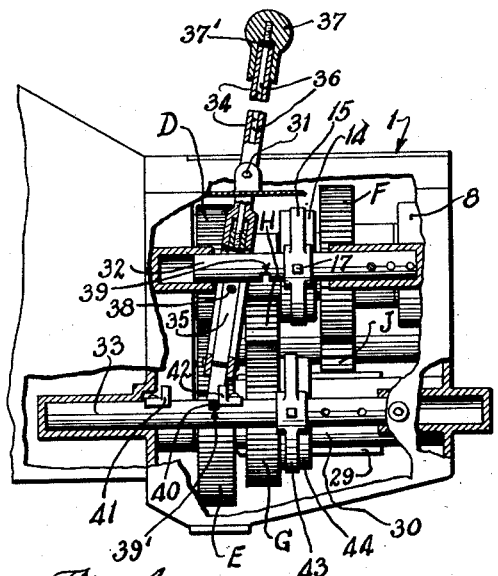
Fig. 4 is a similar view showing the mechanism in reverse gear arrangement.

Gear E is loose on countershaft C and is journalled thereon by means of frictionless bearings 28, 28, and gear G is splined to gear E by means of splines 29 formed on hub 30 of gear E and corresponding grooves on gear G to slidably receive said splines. Gear J is similarly journalled on shaft K and has a splined hub which carries gear H, said gear H being in a transverse plane inwardly of gear E, as shown in Fig. 7 and gear J being in the transverse plane of gears F and G, as shown in Fig. 7. Gear J is in constant mesh with gear F and gear G is shiftable to three different positions as shown in Figs. 1, 3 and 4, i. e. into a position of mesh with gear F as shown in Fig. 1, into a neutral position as shown in Fig. 3, and into a position in mesh with gear H as shown in Fig. 4.

The selector N and gear G are shifted by means of the lever L which is pivotally held at 31 and is associated with a pair of horizontal rods 32 and 33 arranged one above the other, as shown in Figs. 1 to 6, inclusive. Said shift lever has an upper tubular member 34 and a relatively slidable yoke 35 carried thereby and supported by means of a rod 36 which terminates at its upper end in an operating button or knob 37. Said knob is slidable with rod 36 on member 34 against the tension of a spring 37' which is compressible between the knob and the end of member 34, said spring tending to hold the knob, rod and yoke 35 upwardly under normal conditions but permitting the depression of the yoke when pressure is applied to the knob.

Figure 2:
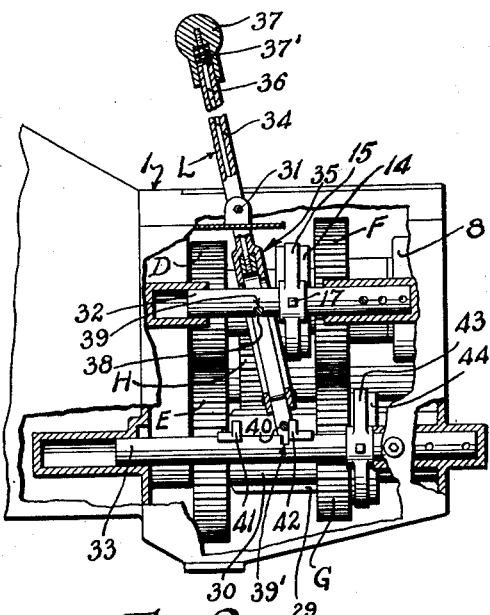
Fig. 2 is a similar elevation showing the mechanism in shifted position for low or first forward gear driving.

Yoke 35 carries a pin 38 which normally seats in a notch 39 in rod 32 and a lower pin 40 which normally disengages a similar notch 39' in rod 33 and is adapted to selectively engage lugs 41 or 42 on rod 33. Thus, pin 38 shifts rod 32, yoke 15, collar 14 and selector N within sleeve 13 when lever L is moved backwardly or forwardly without depressing the knob 37 so as to establish a low gear connection as shown in Fig. 2 or a high gear connection as shown in Fig. 3. When knob 37 is depressed, however, the lowermost pin 40 in yoke 35 engages notch 39' in rod 33, as shown in Fig. 4, for establishing a reverse gear connection. Rod 33 carries a yoke 43 which engages a collar or hub 44 on gear G for shifting said gear when the yoke is shifted.

As shown in Figs. 1 and 7, the gears are in neutral relation with gears D and E in mesh and gears F and G in mesh, thereby applying power from shaft A through clutch M to gear D, thence to gear E and gear G and thence to gear F while shaft B remains motionless. The shift to low gear is effected by moving lever L forwardly, as shown in Fig. 2, thereby moving shaft 32 rearwardly together with associated parts 14 and N, the pin 40 in such case barely clearing lug 42 on rod 33 and retaining gears F and G in mesh. The rearward movement of rod 32 causes the right hand end cam 20 of selector N to engage and radially extend the set of plungers 21 associated with gear F into seats in the notches 12 in said gear, thereby locking gear F to driven shaft B. Thus power is applied from shaft A through gears D, E, G and F to shaft B.

For a direct driving connection between shafts A and B the lever L is shifted rearwardly, as shown in Fig. 3, without depressing knob 37, thereby moving rod 32 forwardly by reason of the engagement of pin 38 with notch 39, and also moving rod 33 forwardly by reason of the engagement of pin 33 with lug 41 on rod 33 so as to position gear G at a place intermediate the planes of gears H and F, and to slide selector N forwardly for extending the set of plungers 21 into operative engagement with gear D. In this case power is applied from shaft A through gear D and sleeve 13 to driven shaft B, thereby establishing a direct driving connection, while E and G are still rotatable from gear D only as idle gears.

For effecting a reverse driving connection, lever L is shifted rearwardly, as shown in Fig. 4, with the knob 37 held downwardly so as to disengage pin 38 from notch 39 in rod 32 and to engage pin 40 with notch 39' in rod 33, whereupon rod 33 is moved forwardly without shifting selector N from its low gear position so as to position gear G in mesh with gear H.

Thus, power is applied from shaft A through gears D, E, G, H, and J to shaft B, gear J being in constant mesh with gear F which is still in the lock-up position. A particular feature of this invention resides in the provision of the shiftable gear G on countershaft C and the nonshiftability of the driving gear D and the driven gear F.

It will be apparent that the addition of one or more forward driving connections will modify the mechanism shown and described only in the provision of additional shift rods or yokes such as are used in conventional transmission mechanisms. The shift lever L being movable only backwardly and forwardly for effecting the several driving connections, eliminates the use of the conventional H slot in which the shift lever is movable both laterally and longitudinally and simplifies the operation of the mechanism.

The plungers 21 are prevented from turning in their bearings by means of the engagement of members 23 with the flat facets 26. Thus, the beveled portions 27 are constantly in position for engagement with the cam portions 28 of member N.

By reference to Fig. 8 it will be observed that when the gear D is rotated in a counter-clockwise direction plungers 21 will frictionally engage the innermost surfaces of the notches 12 in gear D before they attain a positive locking position with the outermost terminals of said notches. Thus upon the operation of the cam N in one or the other directions the plungers 21 in gear D or F will be extended gradually outwardly during the rotation of said gears until they positively lock one of said gears to the driven shaft B. In this way the plungers operate as synchronizing means and cause the speeds of the shaft and gear to be approximately equal before the lock-up action of the plungers takes place.

What I claim is:

1. A transmission mechanism comprising: coaxial driving and driven shafts, a driving gear on the driving shaft, a driven gear loose on the driven shaft, a countershaft, a pair of gears loose on the countershaft one of which is fixed to and slidable on the other, the fixed gear of said pair being continuously meshed with said driving gear, the slidable gear of said pair being shiftable relative to said driven gear, and longitudinally shiftable means intermediate said driving and driven gears for selectively locking said driving and driven gears to said driven shaft.

2. A transmission mechanism comprising: coaxial driving and driven shafts, a driving gear on the driving shaft, a driven gear loose on the driven shaft, a countershaft, a pair of gears loose on the countershaft one of which is fixed to and slidable on the other, the fixed gear of said pair being continuously meshed with said driving gear, the slidable gear of said pair being shiftable relative to said driven gear, and longitudinally shiftable means intermediate said driving and driven gears for selectively locking said driving and driven gears to said driven shaft, and reverse gearing associated with said driven gear whereby said driven gear is effective for operating said driven shaft, in forward or reverse directions.

3. A transmission mechanism comprising: coaxial driving and driven shafts, driving and driven gears on said shafts, respectively, a countershaft, a fixed gear on said countershaft continuously meshing with said driving gear, a shiftable gear fixed for rotation with and shiftable relative to said fixed gear, a pair of coaxial idler gears offset from the axes of said coaxial shafts and said countershaft, locking means carried by said driving and driven gears, shiftable means carried by said driven shaft for actuating said locking means selectively, one of said idler gears being continuously meshed with said driven gear, and manually operable means for commonly shifting said shiftable means and said shiftable gear whereby said driving and driven shafts may be directly and indirectly connected for different speeds forward and in reverse gear, said other idler gear being arranged to mesh with said shiftable gear to establish a reverse gear drive.

4. A transmission mechanism comprising: coaxial driving and driven shafts, a driving gear on said driving shaft encompassing an end of said driven shaft, a driven gear loose on said driven shaft, means for selectively locking said driving and driven gears to said driven shaft for establishing direct and indirect driving connections between said shafts, a pair of relatively fixed and shiftable gears coaxially mounted on an axis offset from said driving and driven shafts and arranged for connection, respectively, with said driving and driven gears, a pair of coaxial idler gears offset from said driving and driven shaft and also from said pair of gears, one of said idler gears being meshed with said driven gear and the other idler gear adapted to selectively mesh with said shiftable gear, and manually operable shift means arranged to operate said locking means and to shift said shiftable gear independently or together.

5. A transmission mechanism comprising: coaxial driving and driven shafts, driving and driven gears thereon, respectively, shiftable locking means carried by said driven shaft intermediate said driving and driven gears for establishing direct and indirect driving connections between said shafts, countergears including a shiftable gear for indirectly connecting said shafts, reverse idler gears for connecting said shiftable gear with said driven gear, and manually operable shift means for shifting said shiftable gear and operating said locking means independently or together.

6. A transmission mechanism comprising: coaxial driving and driven shafts, driving and driven gears thereon, respectively, shiftable locking means carried by said driven shaft intermediate said driving and driven gears for establishing direct and indirect driving connections between said shafts, countergears including a shiftable gear for indirectly connecting said shafts, reverse idler gears for connecting said shiftable gear with said driven gear, and manually operable shift means for shifting said shiftable gear and operating said locking means independently or together, said shift means including a lever movable to a single position forwardly and backwardly of neutral position in a single plane for establishing said driving connections.

7. A transmission mechanism comprising: coaxial driving and driven shafts, driving and driven gears thereon, respectively, shiftable locking means carried by said driven shaft intermediate said driving and driven gears for establishing direct and indirect driving connections between said shafts, countergears including a shiftable gear for indirectly connecting said shafts, reverse idler gears for connecting said shiftable gear with said driven gear, manually operable shift means for shifting said shiftable gear and operating said locking means independently or together, said shift means including a lever formed of relatively adjustable portions and parallel rods shiftable longitudinally, and cooperating means on said lever and on said rods for effecting said shifting operations selectively.

8. A transmission mechanism comprising: coaxial driving and driven shafts, driving and driven gears thereon, respectively, a countershaft, relatively shiftable gears on said countershaft for indirectly connecting said shafts through said driving and driven gears, manually operable means for shifting at least one of said countergears, said driven gear being loose on said driven shaft, and manually shiftable means for selectively locking said driving and driven gears to said driven shaft for optionally establishing direct or indirect driving connections.

9. A transmission mechanism comprising: coaxial driving and driven shafts, driving and driven gears thereon, respectively, a countershaft, relatively shiftable gears on said countershaft for indirectly connecting said shafts through said driving and driven gears, manually operable means for shifting at least one of said countergears, said driven gear being loose on said driven shaft, and manually shiftable means for selectively locking said driving and driven gears to said driven shaft for optionally establishing direct or indirect driving connections, said manually operable shift means being common to said locking means and said countergear.

10. A transmission mechanism comprising: coaxial driving and driven shafts, driving and driven gears thereon, respectively, a countershaft, relatively shiftable gears on said countershaft for indirectly connecting said shafts through said driving and driven gears, manually operable means for shifting at least one of said countergears, said driven gear being loose on said driven shaft, manually shiftable means for selectively locking said driving and driven gears to said driven shaft for optionally establishing direct or indirect driving connections, said manually operable shift means being common to said locking means and said countergear, and means associated with said shift means for selectively shifting said locking means and said countergear independently or together.

ARNOLD H. JESSEN.